US011314868B2

(12) United States Patent
Hou et al.

(10) Patent No.: US 11,314,868 B2
(45) Date of Patent: Apr. 26, 2022

(54) RAPIDLY ESTABLISHING A CHAIN OF TRUST IN A COMPUTING SYSTEM

(71) Applicant: Fungible, Inc., Santa Clara, CA (US)

(72) Inventors: Yvonne Hou, Fremont, CA (US); Sunil Mekad, Bangalore (IN); Prathap Sirishe, Milpitas, CA (US); Satish D Deo, Cupertino, CA (US); Umar Badusha, Bangalore (IN)

(73) Assignee: Fungible, Inc., Santa Clara, CA (US)

( * ) Notice: Subject to any disclaimer, the term of this patent is extended or adjusted under 35 U.S.C. 154(b) by 327 days.

(21) Appl. No.: 16/556,439

(22) Filed: Aug. 30, 2019

(65) Prior Publication Data

US 2020/0074083 A1     Mar. 5, 2020

(30) Foreign Application Priority Data

Aug. 31, 2018  (IN) .............................. 201841032795

(51) Int. Cl.
  *G06F 21/57*   (2013.01)
  *H04L 9/32*    (2006.01)
  *G06F 11/14*   (2006.01)

(52) U.S. Cl.
  CPC ........ *G06F 21/575* (2013.01); *G06F 11/1417* (2013.01); *G06F 11/1441* (2013.01); *H04L 9/3252* (2013.01)

(58) Field of Classification Search
  CPC .............. G06F 21/575; G06F 11/1441; G06F 11/1417; H04L 9/3252

(Continued)

(56) References Cited

U.S. PATENT DOCUMENTS

| 2006/0179302 A1* | 8/2006 | Hatakeyama ........... G06F 21/51 713/164 |
| 2006/0179324 A1* | 8/2006 | Hatakeyama ....... G06F 12/1408 713/187 |

(Continued)

FOREIGN PATENT DOCUMENTS

WO    2018005479 A1    1/2018

OTHER PUBLICATIONS

International Search Report and Written Opinion of International Application No. PCT/US2019/048960, dated Nov. 4, 2019, 13 pp.

(Continued)

*Primary Examiner* — Michael J Brown
(74) *Attorney, Agent, or Firm* — Shumaker & Sieffert, P.A.

(57) ABSTRACT

A system root of trust device of a computing system authenticates boot images associated with data processing units of the computing system. The device includes at least one processor configured to determine whether a first set of boot code associated with a first processor of the computing system is authentic, in response to determining that the first set of boot code is authentic, reset the first processor to allow the first processor to boot and authenticate first executable code to be executed by the first processor, after resetting the first processor, determine whether a second set of boot code associated with a second processor of the computing system is authentic, and in response to determining that the second set of boot code is authentic, reset the second processor to allow the second processor to boot and to authenticate second executable code to be executed by the second processor.

17 Claims, 6 Drawing Sheets

(58) Field of Classification Search
USPC .................................................. 713/1, 2, 100
See application file for complete search history.

(56) References Cited

U.S. PATENT DOCUMENTS

| | | |
|---|---|---|
| 2009/0327684 A1 | 12/2009 | Zimmer et al. |
| 2015/0012737 A1 | 1/2015 | Newell |
| 2015/0199520 A1 | 7/2015 | Woolley et al. |
| 2018/0060589 A1* | 3/2018 | Polak .................... H04L 63/123 |
| 2018/0165455 A1* | 6/2018 | Liguori ................. G06F 9/4416 |
| 2018/0287965 A1 | 10/2018 | Sindhu et al. |
| 2019/0012278 A1 | 1/2019 | Sindhu et al. |
| 2019/0013965 A1 | 1/2019 | Sindhu et al. |
| 2019/0104206 A1 | 4/2019 | Goel et al. |
| 2019/0104207 A1 | 4/2019 | Goel et al. |

OTHER PUBLICATIONS

International Preliminary Report on Patentability from International Application No. PCT/US2019/048960, dated Mar. 11, 2021, 7 pp.

* cited by examiner

RAPIDLY ESTABLISHING A CHAIN OF TRUST IN A COMPUTING SYSTEM

This application claims priority to India Patent Application No. 201841032795, filed Aug. 31, 2018, the entire contents of which are hereby incorporated by reference.

TECHNICAL FIELD

This disclosure relates to devices for processing packets of information, for example, in the fields of networking and storage.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems and environmental control systems.

In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy. A typical data center switch fabric includes multiple tiers of interconnected switches and routers. In conventional implementations, packets for a given packet flow between a source server and a destination server or storage system are forwarded from the source to the destination along a single path through the routers and switches comprising the switching fabric.

A data center typically includes multiple racks of computing systems. Each system includes multiple processors, each of which executes a variety of processes. Most commonly used processors (e.g., X86 based CPUs, ARM, MIPS, and other such processors) do not authenticate respective BIOS/boot images before execution. This presents a potential opportunity for hackers to alter the BIOS or the boot images before the processor starts execution, causing negative impact on the security of a computing system.

SUMMARY

In general, this disclosure describes techniques for establishing a chain of trust in a computing system. A computing system according to these techniques includes a system root of trust that authenticates itself, and then authenticates the BIOS/boot image of each of a plurality of processors in the computing system. After the BIOS/boot image of a processor has been authenticated, that processor can begin authenticating its associated processes, while the system root of trust authenticates a subsequent BIOS/boot image of a subsequent processor. In this manner, these techniques can achieve parallelism between authentication of the processors and the processes executed by the processors. These techniques may be used to efficiently authenticate multiple boot images for multiple processor subsystems to establish a chain of trust for the entire computing system while preventing undue impact on the overall boot time of the computing system, which may be caused by having a system root of trust device authenticate the processors and the processes associated with the processors sequentially.

In one example, a method includes determining, by a system root of trust device of a computing system, whether a first set of boot code associated with a first processor of the computing system is authentic; in response to determining that the first set of boot code is authentic, resetting, by the system root of trust device, the first processor to allow the first processor to boot and to authenticate one or more sets of first executable code to be executed by the first processor; after resetting the first processor, determining, by the system root of trust device, whether a second set of boot code associated with a second processor of the computing system is authentic; and in response to determining that the second set of boot code is authentic, resetting, by the system root of trust device, the second processor to allow the second processor to boot and to authenticate one or more sets of second executable code to be executed by the second processor.

In another example, a system root of trust device of a computing system includes one or more processors implemented in circuitry and configured to determine whether a first set of boot code associated with a first processor of the computing system is authentic; in response to determining that the first set of boot code is authentic, reset the first processor to allow the first processor to boot and to authenticate one or more sets of first executable code to be executed by the first processor; after resetting the first processor, determine whether a second set of boot code associated with a second processor of the computing system is authentic; and in response to determining that the second set of boot code is authentic, reset the second processor to allow the second processor to boot and to authenticate one or more sets of second executable code to be executed by the second processor.

In another example, a computing system includes a plurality of processors including a first processor and a second processor; and a system root of trust device comprising one or more processors implemented in circuitry and configured to determine whether a first set of boot code associated with a first processor of the computing system is authentic; in response to determining that the first set of boot code is authentic, reset the first processor to allow the first processor to boot and to authenticate one or more sets of first executable code to be executed by the first processor; after resetting the first processor, determine whether a second set of boot code associated with a second processor of the computing system is authentic; and in response to determining that the second set of boot code is authentic, reset the second processor to allow the second processor to boot and to authenticate one or more sets of second executable code to be executed by the second processor.

In another example, a computer-readable storage medium has stored thereon instructions that, when executed, cause a processor of a system root of trust device of a computing system to determine whether a first set of boot code associated with a first processor of the computing system is authentic; in response to determining that the first set of boot code is authentic, reset the first processor to allow the first processor to boot and to authenticate one or more sets of first executable code to be executed by the first processor; after resetting the first processor, determine whether a second set of boot code associated with a second processor of the computing system is authentic; and in response to determining that the second set of boot code is authentic, reset the second processor to allow the second processor to boot and to authenticate one or more sets of second executable code to be executed by the second processor.

The details of one or more examples are set forth in the accompanying drawings and the description below. Other features, objects, and advantages will be apparent from the description and drawings, and from the claims.

DETAILED DESCRIPTION

Figure 1:
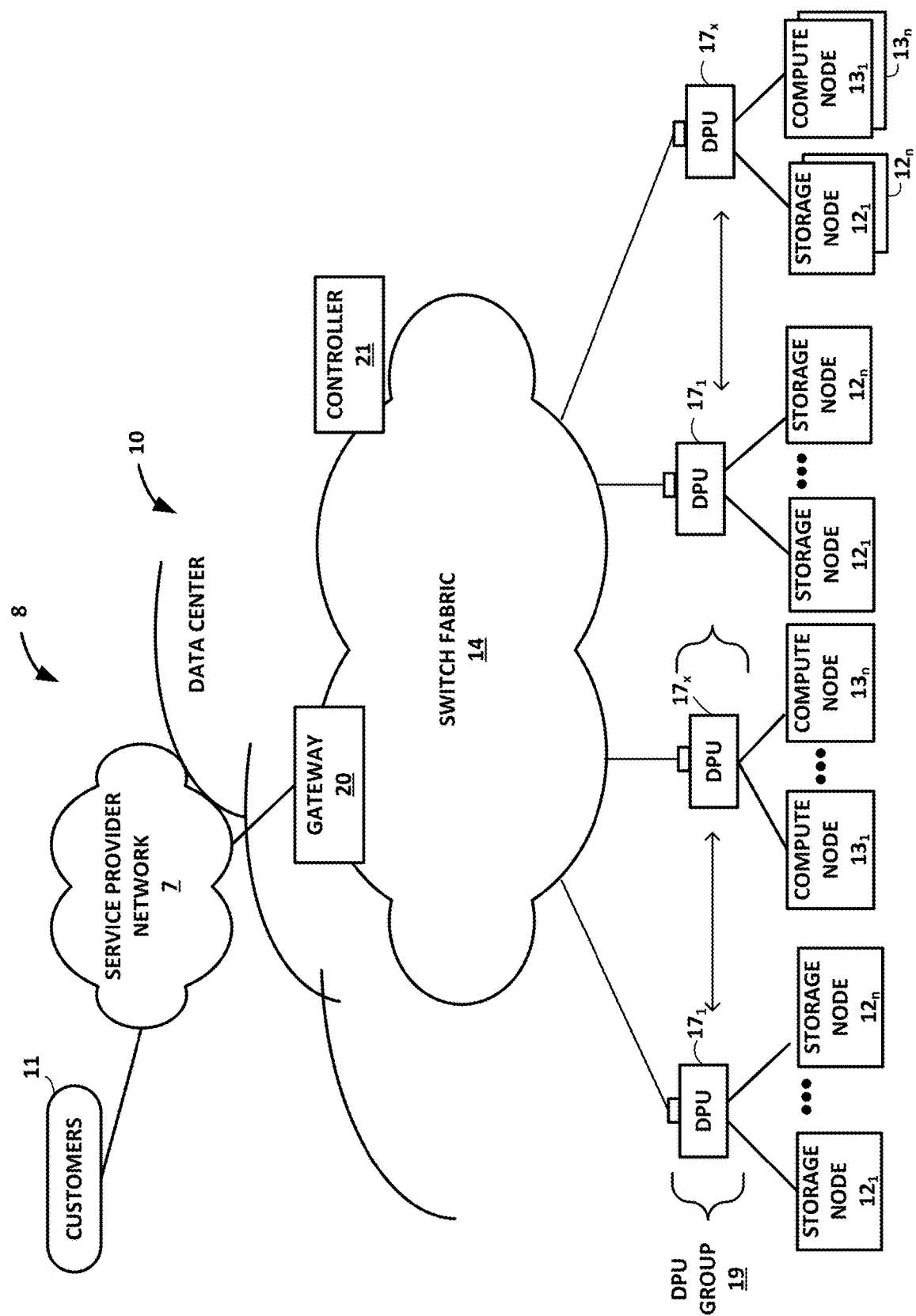
FIG. 1 is a block diagram illustrating an example system having a data center in which examples of the techniques described herein may be implemented.

FIG. 1 is a block diagram illustrating an example system 8 having a data center 10 in which examples of the techniques described herein may be implemented. In general, data center 10 provides an operating environment for applications and services for customers 11 coupled to the data center by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In this example, data center 10 includes a set of storage nodes 12 and compute nodes 13 interconnected via a high-speed switch fabric 14. In some examples, storage nodes 12 and compute nodes 13 are arranged into multiple different groups, each including any number of nodes up to, for example, n storage nodes $12_1$-$12_n$ and n compute nodes $13_1$-$13_n$ (collectively, "storage nodes 12" and "compute nodes 13"). Storage nodes 12 and compute nodes 13 provide storage and computation facilities, respectively, for applications and data associated with customers 11 and may be physical (bare-metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10. In some examples, SDN controller 21 may operate in response to configuration input received from a network administrator. In some examples, SDN controller 21 operates to configure data processing units (DPUs) 17 to logically establish one or more virtual fabrics as overlay networks dynamically configured on top of the physical underlay network provided by switch fabric 14. For example, SDN controller 21 may learn and maintain knowledge of DPUs 17 and establish a communication control channel with each of DPUs 17. SDN controller 21 uses its knowledge of DPUs 17 to define multiple sets (groups) of two of more DPUs 17 to establish different virtual fabrics over switch fabric 14. More specifically, SDN controller 21 may use the communication control channels to notify each of DPUs 17 for a given set which other DPUs 17 are included in the same set.

In response, DPUs 17 dynamically setup FCP tunnels with the other DPUs included in the same set as a virtual fabric over packet switched network 410. In this way, SDN controller 21 defines the sets of DPUs 17 for each of the virtual fabrics, and the DPUs are responsible for establishing the virtual fabrics. As such, underlay components of switch fabric 14 may be unaware of virtual fabrics. In these examples, DPUs 17 interface with and utilize switch fabric 14 so as to provide full mesh (any-to-any) interconnectivity between DPUs of any given virtual fabric. In this way, the servers connected to any of the DPUs forming a given one of virtual fabrics may communicate packet data for a given packet flow to any other of the servers coupled to the DPUs for that virtual fabric using any of a number of parallel data paths within switch fabric 14 that interconnect the DPUs of that virtual fabric. More details of DPUs operating to spray packets within and across virtual overlay networks are available in U.S. Provisional Patent Application No. 62/638,788, filed Mar. 5, 2018, entitled "NETWORK DPU VIRTUAL FABRICS CONFIGURED DYNAMICALLY OVER AN UNDERLAY NETWORK" and U.S. patent application Ser. No. 15/939,227, filed Mar. 28, 2018, entitled "NON-BLOCKING ANY-TO-ANY DATA CENTER NETWORK WITH PACKET SPRAYING OVER MULTIPLE ALTERNATE DATA PATHS", the entire contents of each of which are incorporated herein by reference.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

As further described herein, in one example, each DPU 17 is a highly programmable I/O processor specially designed for offloading certain functions from storage nodes 12 and compute nodes 13. In one example, each of DPUs 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each DPU 17 includes components for fully implementing and processing network and storage stacks on behalf of one or more storage nodes 12 or compute nodes 13. In addition, DPUs 17 may be programmatically configured to serve as a security gateway for its respective storage nodes 12 or compute nodes 13, freeing up the processors of the servers to dedicate resources to application workloads.

In some example implementations, each DPU 17 may be viewed as a network interface subsystem that implements full offload of the handling of data packets (with zero copy in server memory) and storage acceleration for the attached server systems. In one example, each DPU 17 may be implemented as one or more application-specific integrated circuit (ASIC) or other hardware and software components, each supporting a subset of the servers. DPUs 17 may also be referred to as access nodes, or devices including access nodes. In other words, the term access node may be used herein interchangeably with the term DPU. Additional example details of various example DPUs are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of both being incorporated herein by reference In example implementations, DPUs 17 are configurable to operate in a standalone network appliance having one or more DPUs. For example, DPUs 17 may be arranged into multiple different DPU groups 19, each including any number of DPUs up to, for example, x DPUs $17_1$-$17_x$. As such, multiple DPUs 17 may be grouped (e.g., within a single electronic device or network appliance), referred to herein as a DPU group 19, for providing services to a group of servers supported by the set of DPUs internal to the device. In one example, a DPU group 19 may comprise four DPUs 17, each supporting four servers so as to support a group of sixteen servers.

In the example of FIG. 1, each DPU 17 provides connectivity to switch fabric 14 for a different group of storage nodes 12 or compute nodes 13 and may be assigned respective IP addresses and provide routing operations for the storage nodes 12 or compute nodes 13 coupled thereto. As described herein, DPUs 17 provide routing and/or switching functions for communications from/directed to the individual storage nodes 12 or compute nodes 13. For example, as shown in FIG. 1, each DPU 17 includes a set of edge-facing electrical or optical local bus interfaces for communicating with a respective group of storage nodes 12 or compute nodes 13 and one or more core-facing electrical or optical interfaces for communicating with core switches within switch fabric 14. In addition, DPUs 17 described herein may provide additional services, such as storage (e.g., integration of solid-state storage devices), security (e.g., encryption), acceleration (e.g., compression), I/O offloading, and the like. In some examples, one or more of DPUs 17 may include storage devices, such as high-speed solid-state drives or rotating hard drives, configured to provide network accessible storage for use by applications executing on the servers. Although not shown in FIG. 1, DPUs 17 may be directly coupled to each other, such as direct coupling between DPUs in a common DPU group 19, to provide direct interconnectivity between the DPUs of the same group. For example, multiple DPUs 17 (e.g., 4 DPUs) may be positioned within a common DPU group 19 for servicing a group of servers (e.g., 16 servers).

As one example, each DPU group 19 of multiple DPUs 17 may be configured as standalone network device, and may be implemented as a two rack unit (2RU) device that occupies two rack units (e.g., slots) of an equipment rack. In another example, DPU 17 may be integrated within a server, such as a single 1RU server in which four CPUs are coupled to the forwarding ASICs described herein on a mother board deployed within a common computing device. In yet another example, one or more of DPUs 17, storage nodes 12, and compute nodes 13 may be integrated in a suitable size (e.g., 10RU) frame that may, in such an example, become a network storage compute unit (NSCU) for data center 10. For example, a DPU 17 may be integrated within a mother board of a storage node 12 or a compute node 13 or otherwise co-located with a server in a single chassis.

In accordance with the techniques of this disclosure, although not shown in FIG. 1, in some examples a computing system may include a DPU group 19 as well as a system root of trust device. The system root of trust device may authenticate boot images associated with each of DPUs 17 of DPU group 19. After a boot image has been authenticated, the corresponding one of DPUs 17 may proceed to authenticate its associated processes while the system root of trust device proceeds to authenticate the boot image of the next one of DPUs 17. To authenticate the boot images and other sets of executable code, the system root of trust device and the processors may perform asymmetric key authentication, such as Elliptical Curve Digital Signature Algorithm (ECDSA).

In some example implementations, DPUs 17 interface and utilize switch fabric 14 so as to provide full mesh (any-to-any) interconnectivity such that any of storage nodes 12 or compute nodes 13 may communicate packet data for a given packet flow to any other of the servers using any of a number of parallel data paths within the data center 10. For example, in some example network architectures, DPUs spray individual packets for packet flows between the DPUs and across some or all of the multiple parallel data paths in the data center switch fabric 14 and reorder the packets for delivery to the destinations so as to provide full mesh connectivity.

In this way, DPUs 17 interface and utilize switch fabric 14 so as to provide full mesh (any-to-any) interconnectivity such that any of storage nodes 12 or compute nodes 13 may communicate packet data for a given packet flow to any other of the servers using any of a number of parallel data paths within the data center 10. For example, in some example network architectures, DPUs spray individual packets for packet flows between the DPUs and across some or all of the multiple parallel data paths in the data center switch fabric 14 and reorder the packets for delivery to the destinations so as to provide full mesh connectivity.

As described herein, a data transmission protocol referred to as a Fabric Control Protocol (FCP) may be used by the different operational networking components of any of DPUs 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, and may provide numerous advantages, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. More details on the FCP are available in U.S. Provisional Patent Application No. 62/566,060, filed Sep. 29, 2017, entitled "Fabric Control Protocol for Data Center Networks with Packet Spraying Over Multiple Alternate Data Paths," the entire content of which is incorporated herein by reference.

The use of FCP may provide certain advantages. For example, the use of FCP may increase significantly the bandwidth utilization of the underlying switch fabric 14. Moreover, in example implementations described herein, the servers of the data center may have full mesh interconnectivity and may nevertheless be non-blocking and drop-free.

Although DPUs 17 are described in FIG. 1 with respect to switch fabric 14 of data center 10, in other examples, DPUs may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is full connectivity between the DPUs. The packet switched network may use any technology, including IP over Ethernet as well as other technologies. Irrespective of the type of packet switched network, DPUs may spray individual packets for packet flows between the DPUs and across multiple parallel data paths in the packet switched network and reorder the packets for delivery to the destinations so as to provide full mesh connectivity.

Figure 2:
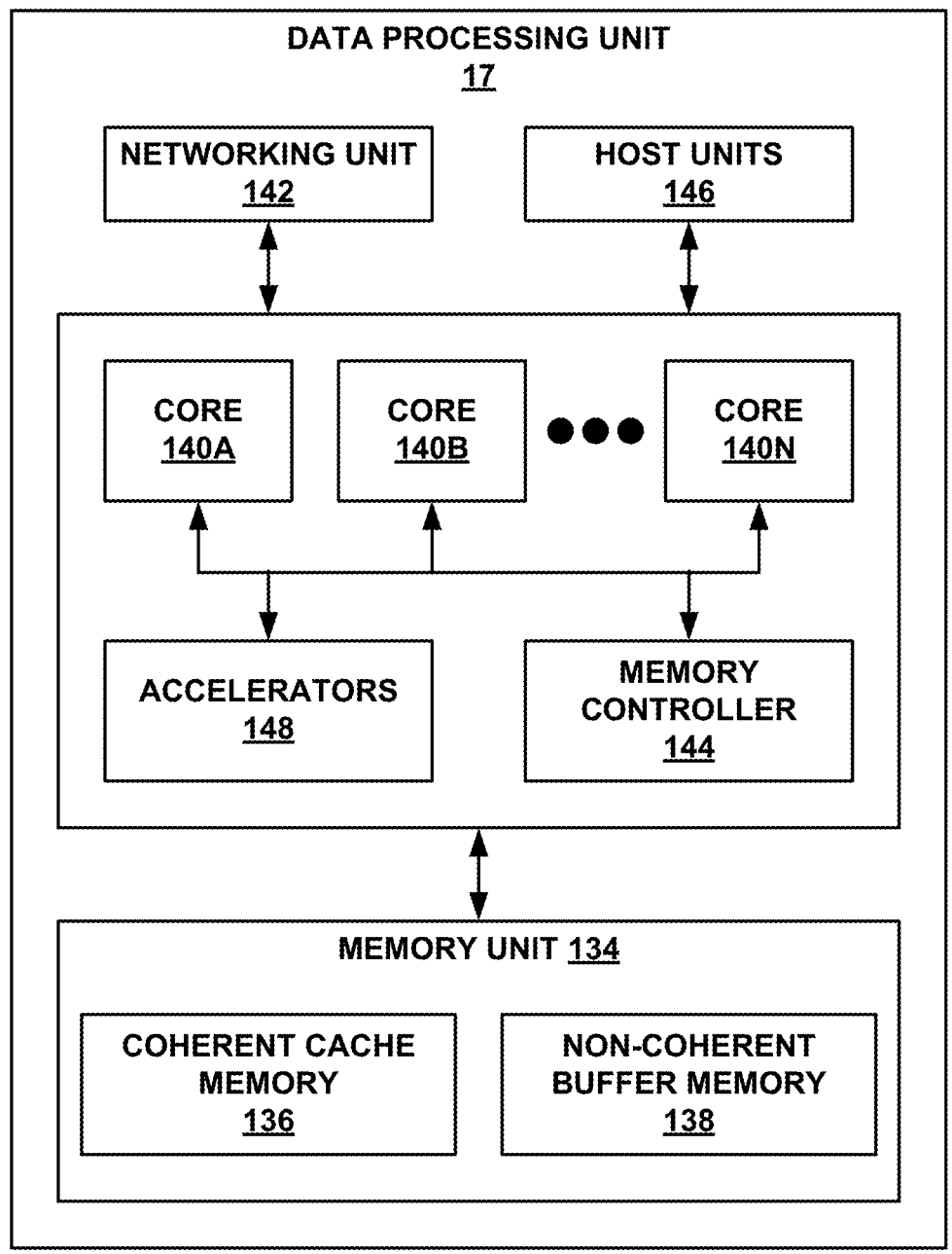
FIG. 2 is a block diagram illustrating an example data processing unit (DPU) of FIG. 1 in further detail, in accordance with the techniques of this disclosure.

FIG. 2 is a block diagram illustrating an example data processing unit (DPU) 17 of FIG. 1 in further detail, in accordance with the techniques of this disclosure. DPU 17 generally represents a hardware chip implemented in digital logic circuitry. DPU 17 may operate substantially similar to any of DPUs 17$_1$-17$_N$ of FIG. 1. Thus, DPU 17 may be communicatively coupled to a CPU, a GPU, one or more network devices, server devices, random access memory, storage media (e.g., solid state drives (SSDs)), a data center fabric, or the like, e.g., via PCI-e, Ethernet (wired or wireless), or other such communication media.

In the illustrated example of FIG. 2, DPU 17 includes a plurality of programmable processing cores 140A-140N ("cores 140") and a memory unit 134. Memory unit 134 may include two types of memory or memory devices, namely coherent cache memory 136 and non-coherent buffer memory 138. In some examples, plurality of cores 140 may include at least two processing cores. In one specific example, plurality of cores 140 may include six processing cores. DPU 17 also includes a networking unit 142, one or more PCIe interfaces 146, a memory controller 144, and one or more accelerators 148. As illustrated in FIG. 2, each of cores 140, networking unit 142, memory controller 144, PCIe interfaces 146, accelerators 148, and memory unit 134 including coherent cache memory 136 and non-coherent buffer memory 138 are communicatively coupled to each other.

In this example, DPU 17 represents a high performance, hyper-converged network, storage, and data processor and input/output hub. Cores 140 may comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or CISC (complex instruction set computing or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

As described herein, the new processing architecture utilizing a DPU may be especially efficient for stream processing applications and environments. For example, stream processing is a type of data processing architecture well suited for high performance and high efficiency processing. A stream is defined as an ordered, unidirectional sequence of computational objects that can be of unbounded or undetermined length. In a simple example, a stream originates in a producer and terminates at a consumer, and is operated on sequentially. In some examples, a stream can be defined as a sequence of stream fragments; each stream fragment including a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. For example, TCP receive (Rx) processing consumes segments (fragments) to produce an ordered byte stream. The reverse processing is performed in the transmit (Tx) direction. Independently of the stream type, stream manipulation requires efficient fragment manipulation, where a fragment is as defined above.

In some examples, the plurality of cores 140 may be capable of processing a plurality of events related to each data packet of one or more data packets, received by networking unit 142 and/or PCIe interfaces 146, in a sequential manner using one or more "work units." In general, work units are sets of data exchanged between cores 140 and networking unit 142 and/or PCIe interfaces 146 where each work unit may represent one or more of the events related to a given data packet of a stream. As one example, a Work Unit (WU) is a container that is associated with a stream state and used to describe (i.e. point to) data within a stream (stored). For example, work units may dynamically originate within a peripheral unit coupled to the multi-processor system (e.g. injected by a networking unit, a host unit, or a solid state drive interface), or within a processor itself, in association with one or more streams of data, and terminate at another peripheral unit or another processor of the system. The work unit is associated with an amount of work that is relevant to the entity executing the work unit for processing a respective portion of a stream. In some examples, one or more processing cores of a DPU may be configured to execute program instructions using a work unit (WU) stack.

In some examples, in processing the plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

DPU 17 may act as a combination of a switch/router and a number of network interface cards. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as network 7 of FIG. 1. In this way, DPU 17 supports one or more high-speed network interfaces, e.g., Ethernet ports, without the need for a separate network interface card (NIC). Each of PCIe interfaces 146 may support one or more PCIe interfaces, e.g., PCIe ports, for connectivity to an application processor (e.g., an x86 processor of a server device or a local CPU or GPU of the device hosting DPU 17) or a storage device (e.g., an SSD). DPU 17 may also include one or more high bandwidth interfaces for connectivity to off-chip external memory (not illustrated in FIG. 2). Each of accelerators 148 may be configured to perform acceleration for various data-processing functions, such as look-ups, matrix multiplication, cryptography, compression, regular expressions, or the like. For example, accelerators 148 may comprise hardware implementations of look-up engines, matrix multipliers, cryptographic engines, compression engines, regular expression interpreters, or the like.

Memory controller 144 may control access to memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. In some examples, memory controller 144 may map the accesses based on one or more of an address range, an instruction or an operation code within the instruction, a special access, or a combination thereof.

Additional details regarding the operation and advantages of the DPU are available in U.S. patent application Ser. No. 16/031,921, filed Jul. 10, 2018, and titled "DATA PROCESSING UNIT FOR COMPUTE NODES AND STORAGE NODES," and U.S. patent application Ser. No. 16/031,676, filed Jul. 10, 2018, and titled "ACCESS NODE FOR DATA CENTERS", the entire content of each of which is incorporated herein by reference.

Although not shown in FIG. 2, DPU 17 may have an associated boot image/BIOS that DPU 17 executes at boot time. In accordance with the techniques of this disclosure, a system root of trust device, separate from DPU 17, may authenticate the boot image/BIOS associated with DPU 17 prior to DPU 17 being permitted to boot. After the boot image/BIOS has been authenticated, DPU 17 may proceed to boot, and then authenticate one or more associated processes, e.g., processes executed by cores 140 and/or accelerators 148.

Figure 3:
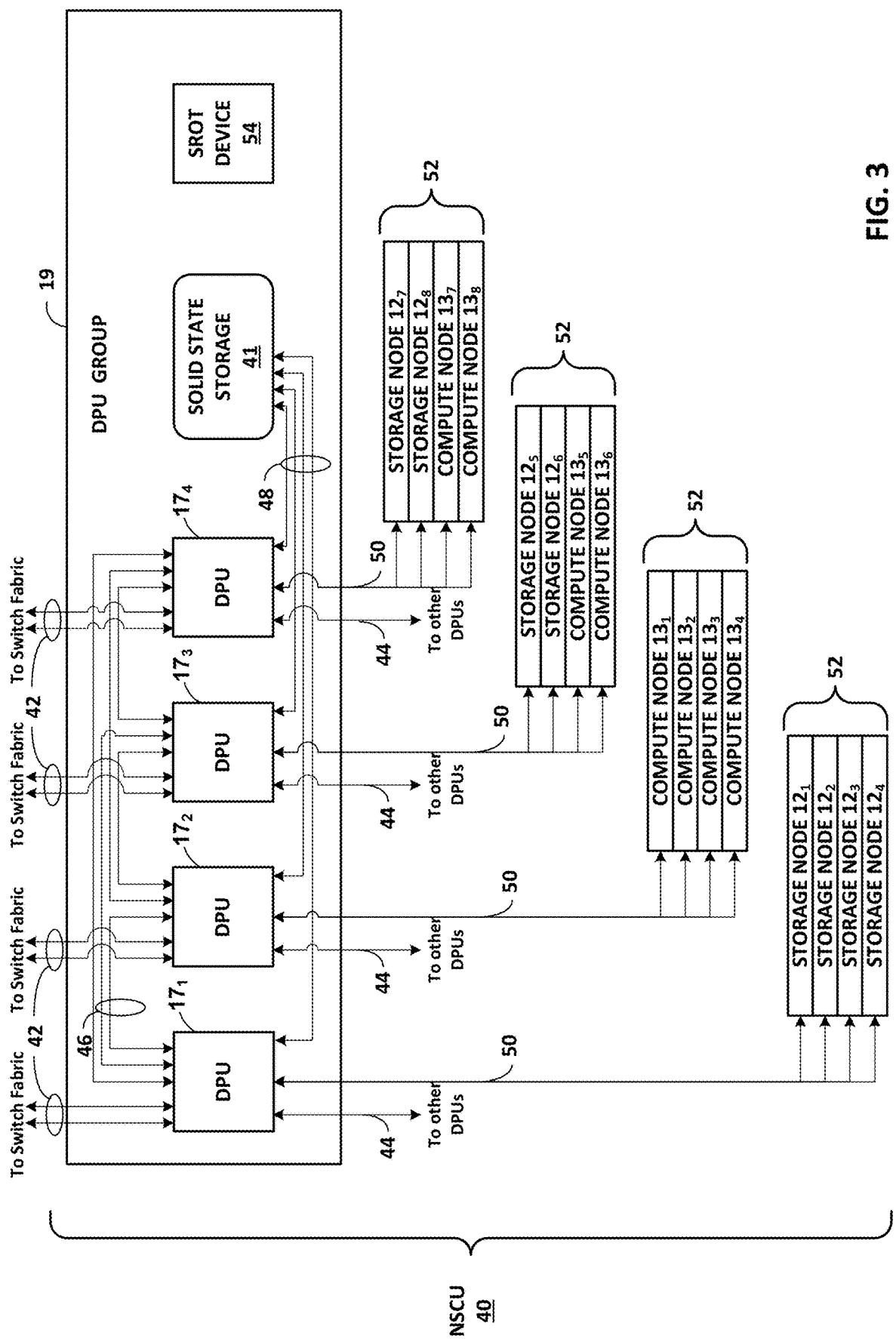
FIG. 3 is a block diagram illustrating one example of network storage compute unit (NSCU) including a DPU group and its supported node group.

FIG. 3 is a block diagram illustrating one example of network storage compute unit (NSCU) 40 including a DPU group 19 and its supported node group 52. In this example, DPU group 19 further includes system root of trust (SROT) device 54. DPU group 19 may be configured to operate as a high-performance I/O hub designed to aggregate and process network and storage I/O to multiple node groups 52. In the particular example of FIG. 3, DPU group 19 includes four DPUs $17_1$-$17_4$ (collectively, "DPUs 17") connected to a pool of local solid state storage 41. In the illustrated example, DPU group 19 supports a total of eight storage nodes $12_1$-$12_8$ (collectively, "storage nodes 12") and eight compute nodes $13_1$-$13_8$ (collectively, compute nodes 13) with each of the four DPUs 17 within DPU group 19 supporting four of storage nodes 12 and compute nodes 13. In some examples, each of the four storage nodes 12 and/or compute nodes 13 supported by each of the DPUs 17 may be arranged as a node group 52. In some examples, the "storage nodes 12" or "compute nodes 13" described throughout this application may be dual-socket or dual-processor "storage nodes" or "compute nodes" that are arranged in groups of two or more within a standalone device, e.g., node group 52. In the example of FIG. 3, a DPU supports four nodes of storage nodes 12 and/or compute nodes 13. The four nodes may be any combination of storage nodes 12 and/or compute nodes 13 (e.g., 4 storage nodes 12 and 0 compute nodes 13, 2 storage nodes 12 and 2 compute nodes 13, 1 storage node 12 and 3 compute nodes 13, 0 storage nodes 12 and 4 compute nodes 13, etc.).

Although DPU group 19 is illustrated in FIG. 3 as including four DPUs 17 that are all connected to a single pool of solid state storage 41, a DPU group may be arranged in other ways. In one example, each of the four DPUs 17 may be included on an individual DPU sled that also includes solid state storage and/or other types of storage for the DPU. In this example, a DPU group may include four DPU sleds each having a DPU and a set of local storage devices.

In one example implementation, DPUs 17 within DPU group 19 connect to node groups 52 and solid state storage 41 using Peripheral Component Interconnect express (PCIe) links 48, 50, and connect to other DPUs and the datacenter switch fabric 14 using Ethernet links 42, 44, 46. For example, each of DPUs 17 may support six high-speed Ethernet connections, including two externally-available Ethernet connections 42 for communicating with the switch fabric, one externally-available Ethernet connection 44 for communicating with other DPUs in other DPU groups, and three internal Ethernet connections 46 for communicating with other DPUs 17 in the same DPU group 19. In one example, each of externally-available connections 42 may be a 100 Gigabit Ethernet (GE) connection. In this example, DPU group 19 has 8×100 GE externally-available ports to connect to the switch fabric 14.

Within DPU group 19, connections 42 may be copper, i.e., electrical, links arranged as 8×25 GE links between each of DPUs 17 and optical ports of DPU group 19. Between DPU group 19 and the switch fabric, connections 42 may be optical Ethernet connections coupled to the optical ports of DPU group 19. The optical Ethernet connections may connect to one or more optical devices within the switch fabric, e.g., optical permutation devices described in more detail below. The optical Ethernet connections may support more bandwidth than electrical connections without increasing the number of cables in the switch fabric. For example, each optical cable coupled to DPU group 19 may carry 4×100 GE optical fibers with each fiber carrying optical signals at four different wavelengths or lambdas. In other examples, the externally-available connections 42 may remain as electrical Ethernet connections to the switch fabric.

The four remaining Ethernet connections supported by each of DPUs 17 include one Ethernet connection 44 for communication with other DPUs within other DPU groups, and three Ethernet connections 46 for communication with the other three DPUs within the same DPU group 19. In some examples, connections 44 may be referred to as "inter-DPU group links" and connections 46 may be referred to as "intra-DPU group links."

Ethernet connections 44, 46 provide full-mesh connectivity between DPUs within a given structural unit. In one example, such a structural unit may be referred to herein as a logical rack (e.g., a half-rack or a half physical rack) that includes two NSCUs 40 having two AGNs 19 and supports an 8-way mesh of eight DPUs 17 for those AGNs. In this particular example, connections 46 would provide full-mesh connectivity between the four DPUs 17 within the same DPU group 19, and connections 44 would provide full-mesh connectivity between each of DPUs 17 and four other DPUs within one other DPU group of the logical rack (i.e., structural unit). In addition, DPU group 19 may have enough, e.g., sixteen, externally-available Ethernet ports to connect to the four DPUs in the other DPU group.

In the case of an 8-way mesh of DPUs, i.e., a logical rack of two NSCUs 40, each of DPUs 17 may be connected to each of the other seven DPUs by a 50 GE connection. For example, each of connections 46 between the four DPUs 17 within the same DPU group 19 may be a 50 GE connection arranged as 2×25 GE links. Each of connections 44 between the four DPUs 17 and the four DPUs in the other DPU group may include four 50 GE links. In some examples, each of the four 50 GE links may be arranged as 2×25 GE links such that each of connections 44 includes 8×25 GE links to the other DPUs in the other DPU group.

In another example, Ethernet connections 44, 46 provide full-mesh connectivity between DPUs within a given structural unit that is a full-rack or a full physical rack that includes four NSCUs 40 having four AGNs 19 and supports a 16-way mesh of DPUs 17 for those AGNs. In this example, connections 46 provide full-mesh connectivity between the four DPUs 17 within the same DPU group 19, and connections 44 provide full-mesh connectivity between each of DPUs 17 and twelve other DPUs within three other DPU group. In addition, DPU group 19 may have enough, e.g., forty-eight, externally-available Ethernet ports to connect to the four DPUs in the other DPU group.

In the case of a 16-way mesh of DPUs, each of DPUs 17 may be connected to each of the other fifteen DPUs by a 25 GE connection, for example. In other words, in this example, each of connections 46 between the four DPUs 17 within the same DPU group 19 may be a single 25 GE link. Each of connections 44 between the four DPUs 17 and the twelve other DPUs in the three other DPU groups may include 12×25 GE links.

As shown in FIG. 3, each of DPUs 17 within a DPU group 19 may also support a set of high-speed PCIe connections 48, 50, e.g., PCIe Gen 3.0 or PCIe Gen 4.0 connections, for communication with solid state storage 41 within DPU group 19 and communication with node groups 52 within NSCU 40. Each of node groups 52 includes four storage nodes 12 and/or compute nodes 13 supported by one of DPUs 17 within DPU group 19. Solid state storage 41 may be a pool of Non-Volatile Memory express (NVMe)-based solid state drive (SSD) storage devices accessible by each of DPUs 17 via connections 48.

In one example, solid state storage 41 may include twenty-four SSD devices with six SSD devices for each of DPUs 17. The twenty-four SSD devices may be arranged in four rows of six SSD devices with each row of SSD devices being connected to one of DPUs 17. Each of the SSD devices may provide up to 16 Terabytes (TB) of storage for a total of 384 TB per DPU group 19. As described in more detail below, in some cases, a physical rack may include four DPU groups 19 and their supported node groups 52. In that case, a typical physical rack may support approximately 1.5 Petabytes (PB) of local solid state storage. In another example, solid state storage 41 may include up to 32 U.2×4 SSD devices. In other examples, NSCU 40 may support other SSD devices, e.g., 2.5" Serial ATA (SATA) SSDs, mini-SATA (mSATA) SSDs, M.2 SSDs, and the like.

In the above described example in which each of the DPUs 17 is included on an individual DPU sled with local storage for the DPU, each of the DPU sleds may include four SSD devices and some additional storage that may be hard drive or solid state drive devices. In this example, the four SSD devices and the additional storage may provide approximately the same amount of storage per DPU as the six SSD devices described in the previous example.

In one example, each of DPUs 17 supports a total of 96 PCIe lanes. In this example, each of connections 48 may be an 8×4-lane PCI Gen 3.0 connection via which each of DPUs 17 may communicate with up to eight SSD devices within solid state storage 41. In addition, each of connections 50 between a given DPU 17 and the four storage nodes 12 and/or compute nodes 13 within the node group 52 supported by the DPU 17 may be a 4×16-lane PCIe Gen 3.0 connection. In this example, DPU group 19 has a total of 256 external facing PCIe links that interface with node groups 52. In some scenarios, DPUs 17 may support redundant server connectivity such that each of DPUs 17 connects to eight storage nodes 12 and/or compute nodes 13 within two different node groups 52 using an 8×8-lane PCIe Gen 3.0 connection.

In another example, each of DPUs 17 supports a total of 64 PCIe lanes. In this example, each of connections 48 may be an 8×4-lane PCI Gen 3.0 connection via which each of DPUs 17 may communicate with up to eight SSD devices within solid state storage 41. In addition, each of connections 50 between a given DPU 17 and the four storage nodes 12 and/or compute nodes 13 within the node group 52 supported by the DPU 17 may be a 4×8-lane PCIe Gen 4.0 connection. In this example, DPU group 19 has a total of 128 external facing PCIe links that interface with node groups 52.

Further, in accordance with the techniques of this disclosure, system root of trust device 54 may be configured to perform authentication of boot images (not shown) of DPUs 17 when DPU group 19 is initially booted. For example, system root of trust device 54 may initially authenticate its own boot image, and then a boot image associated with DPU $17_1$. DPU $17_1$ may then authenticate associated processes that it is to execute, while system root of trust device 54 authenticates a boot image of DPU $17_2$. DPU $17_2$ may then authenticate associated processes that it is to execute, while system root of trust device 54 authenticates a boot image of DPU $17_3$. DPU $17_3$ may then authenticate associated processes that it is to execute, while system root of trust device 54 authenticates a boot image of DPU $17_4$. DPU $17_4$ may then authenticate associated processes that it is to execute. In this manner, DPUs 17 of DPU group 19 and system root of trust device 54 may efficiently establish a chain of trust.

Figure 4:
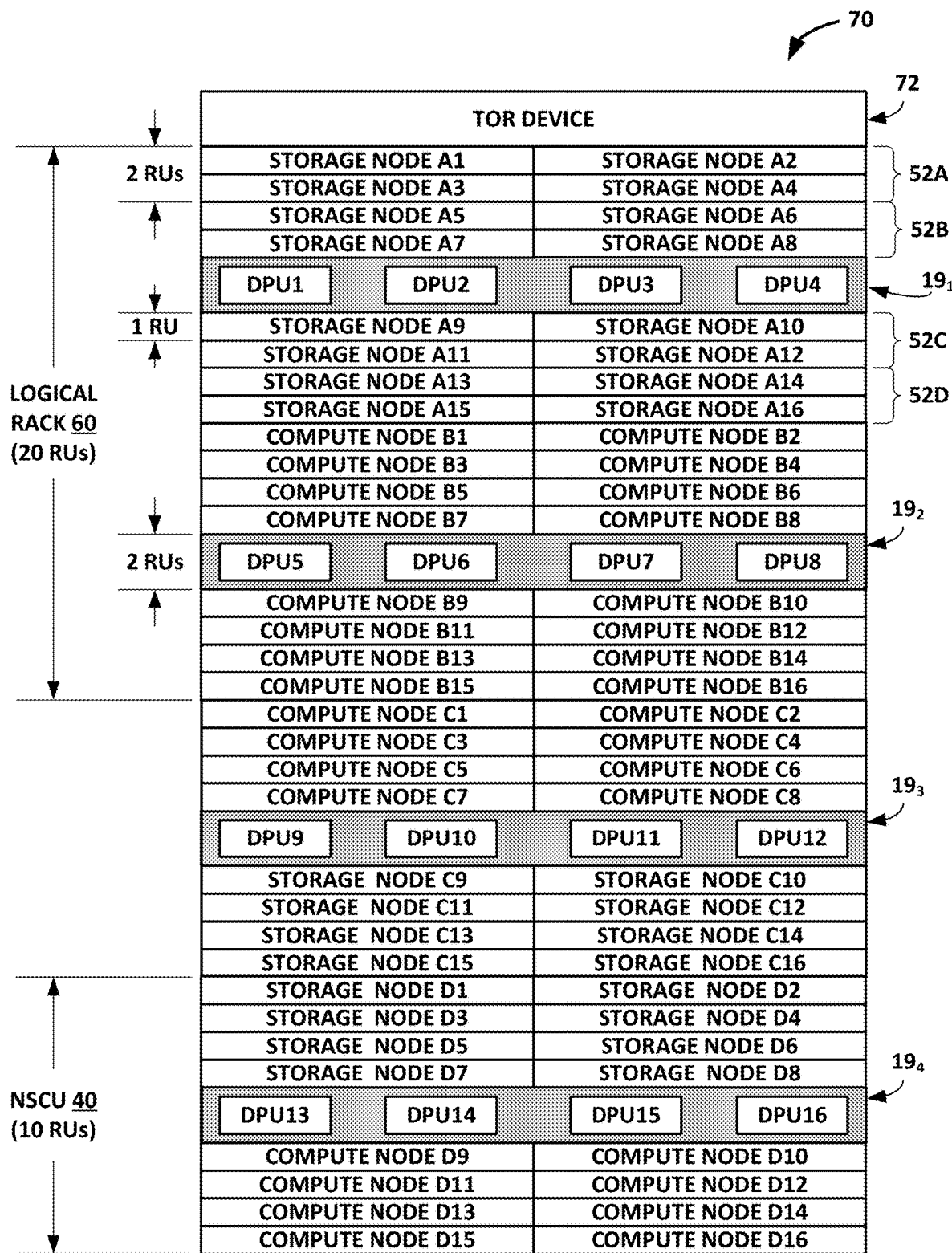
FIG. 4 is a block diagram illustrating an example arrangement of a full physical rack including two logical racks.

FIG. 4 is a block diagram illustrating an example arrangement of a full physical rack 70 including two logical racks 60. In the illustrated example of FIG. 4, rack 70 has 42 rack units or slots in vertical height including a 2 rack unit (2RU) top of rack (TOR) device 72 for providing connectivity to devices within switch fabric 14. In one example, TOR device 72 comprises a top of rack Ethernet switch. In other examples, TOR device 72 comprises an optical permutor described in further detail below. In some examples, rack 70 may not include an additional TOR device 72 and instead have the typical 40 rack units.

In the illustrated example, rack 70 includes four DPU groups $19_1$-$19_4$ that are each separate network appliances 2RU in height. Each of the DPU groups 19 includes four DPUs and may be configured as shown in the example of FIG. 3. For example, DPU group $19_1$ includes DPUs DPU1-DPU4, DPU group $19_2$ includes DPUs DPU5-DPU8, DPU group $19_3$ includes DPUs DPU9-DPU12, and DPU group $19_4$ includes DPUs DPU13-DPU16. DPUs DPU1-DPU16 may be substantially similar to DPUs 17 described above.

Further, rack 70 includes a plurality of storage trays. Each storage tray includes an electrical backplane configured to provide an interface between DPU 17 and one or more storage nodes 12 and compute nodes 13. Further, each storage tray may provide power and physical support to one or more storage nodes 12 and compute nodes 13.

In this example, each of the DPU groups 19 supports sixteen storage nodes and/or compute nodes. For example, DPU group $19_1$ supports storage nodes A1-A16, DPU group $19_2$ supports compute nodes B1-B16, DPU group $19_3$ supports compute nodes C1-C8 and storage nodes C9-C16, and DPU group $19_4$ supports storage nodes D1, D3, D6-D12 and compute nodes D2, D4, D5, and D13-D16. Each storage node or compute node may be a dual-socket or dual-processor server sled that is ½ Rack in width and 1RU in height. In some examples, four of the storage nodes or compute nodes may be arranged into a node group 52 that is 2RU in height. For example, node group 52A includes storage nodes A1-A4, node group 52B includes storage nodes A5-A8, node group 52C includes storage nodes A9-A12, and storage group 52D includes storage nodes A13-A16. Nodes B1-6, C1-6, and D1-6 may be similarly arranged into node groups 52.

DPU groups 19 and node groups 52 are arranged into NSCUs 40 from FIGS. 3-4. NSCUs 40 are 10RU in height and each include one 2RU DPU group 19 and four 2RU node groups 52. As illustrated in FIG. 4, DPU groups 19 and node groups 52 may be structured as a compute sandwich, in which each DPU group 19 is "sandwiched" between two node groups 52 on the top and two node groups 52 on the bottom. For example, with respect to DPU group $19_1$, node group 52A may be referred to as a top second server, node group 52B may be referred to as a top server, node group 52C may be referred to as a bottom server, and node group 52D may be referred to as a bottom second server. In the illustrated structural arrangement, DPU groups 19 are separated by eight rack units to accommodate the bottom two 2RU node groups 52 supported by one DPU group and the top two 2RU node groups 52 supported by another DPU group.

NSCUs 40 may be arranged into logical racks 60, i.e., half physical racks. Logical racks 60 are 20RU in height and each include two NSCUs 40 having full mesh connectivity. In the illustrated example of FIG. 4, DPU group $19_1$ and DPU group $19_2$ are included in the same logical rack 60 along with their respective supported storage and compute nodes A1-A16 and B1-B16. In some examples, DPUs DPU1-DPU8 included the same logical rack 60 are connected to each other in an 8-way mesh. DPUs DPU9-DPU16 may be similarly connected in an 8-way mesh within another logical rack 60 includes DPUs groups $19_3$ and $19_4$ along with their respective storage and compute nodes C1-C16 and D1-D16.

Logical racks 60 within rack 70 may be connected to the switch fabric directly or through an intermediate top of rack device 72. As noted above, in one example, TOR device 72 comprises a top of rack Ethernet switch. In other examples, TOR device 72 comprises an optical permutor that transports optical signals between DPUs 17 and core switches 22 and that is configured such that optical communications are "permuted" based on wavelength so as to provide full-mesh connectivity between the upstream and downstream ports without any optical interference.

In the illustrated example, each of the DPU groups 19 may connect to TOR device 72 via one or more of the 8×100 GE links supported by the DPU group to reach the switch fabric. In one case, the two logical racks 60 within rack 70 may each connect to one or more ports of TOR device 72, and TOR device 72 may also receive signals from one or more logical racks within neighboring physical racks. In other examples, rack 70 may not itself include TOR device 72, but instead logical racks 60 may connect to one or more TOR devices included in one or more neighboring physical racks.

For a standard rack size of 40RU it may be desirable to stay within a typical power limit, such as a 15 kilowatt (kW) power limit. In the example of rack 70, not taking the additional 2RU TOR device 72 into consideration, it may be possible to readily stay within or near the 15 kW power limit even with the sixty-four storage nodes and compute nodes and the four DPU groups. For example, each of the DPU groups 19 may use approximately 1 kW of power resulting in approximately 4 kW of power for DPU groups. In addition, each of the storage nodes and compute nodes may use approximately 200 W of power resulting in around 12.8 kW of power for node groups 52. In this example, the 40RU arrangement of DPU groups 19 and node groups 52, therefore, uses around 16.8 kW of power.

As discussed above, DPU groups 19 may further include a system root of trust device that authenticates boot images associated with respective DPUs 17, and DPUs 17 may authenticate their respective processes.

Figure 5:
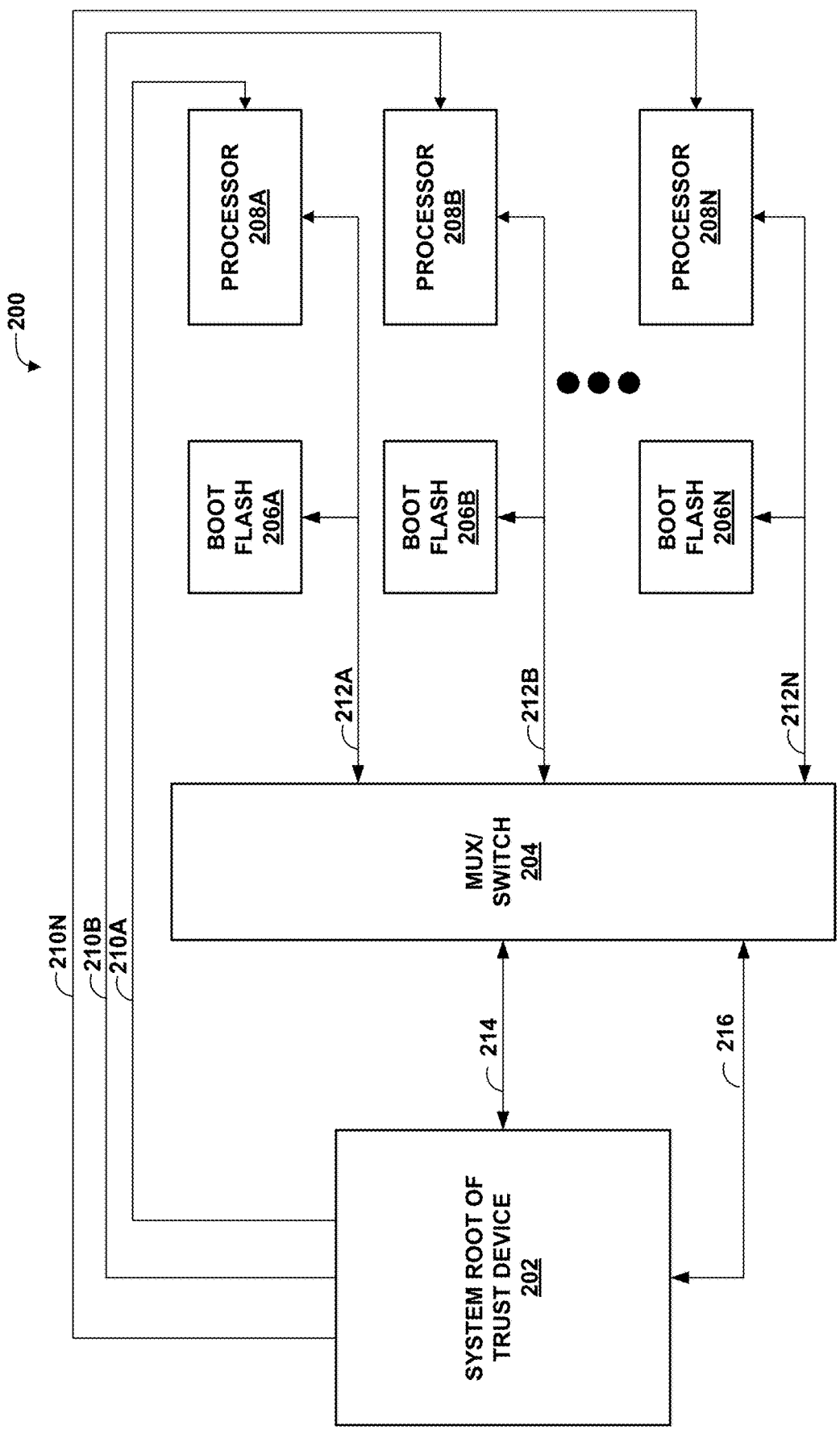
FIG. 5 is a block diagram illustrating an example computing system in accordance with the techniques of this disclosure.

FIG. 5 is a block diagram illustrating an example computing system 200 in accordance with the techniques of this disclosure. In this example, computing system 200 includes system root of trust device 202, multiplexer (mux)/switch element 204, and boot flash devices 206A-206N (boot flash devices 206) associated with corresponding processors 208A-208N (processors 208). As discussed above, processors 208 may in some examples be DPUs, but in other examples may be other types of processors. System root of trust device 202 is coupled to boot flash devices 206 and processors 208 via mux/switch element 204. Processors 208 may each be implemented in respective digital logic circuitry. System root of trust device 202 is also directly coupled to processors 208 via respective processor reset lines 210A-210N (processor reset lines 210), by which system root of trust device 202 may reset the corresponding processors 208, e.g., after authenticating a respective boot code stored on the corresponding one of boot flash devices 206. Mux/switch element 204 is communicatively coupled to boot flash devices 206 and processors 208 via respective serial peripheral interface (SPI) buses 212A-212N. System root of trust device 202 is also coupled to mux/switch element 204 via SPI bus 214 and mux/switch control line 216.

This disclosure recognizes that it is often important that every piece of executable code in a computing system be authenticated before execution. This is important to guarantee the authenticity of the system and to prevent tampering/hacking and resultant malfunctioning of computing system 200. Performing authentication takes time, particularly for a complex system including multiple processor subsystems. A longer authentication time leads to a longer system boot time after the system is powered up. A fast system boot time and complete authentication are desirable features.

In accordance with the techniques of this disclosure, as discussed above, computing system 200 includes system root of trust device 202. As noted, system root of trust device 202 is separate from processors 208 and is tasked with authenticating boot images stored on boot flash devices 206, while processors 208 are held in reset via respective processor reset lines 210.

If system root of trust device 202 authenticates the boot code on one of boot flash devices 206 associated with one of processors 208, system root of trust device 202 allows the corresponding one of processors 208 to boot. System root of trust device 202 only allows the one of processors 208 to boot from its authenticated boot code. When one of processors 208 runs its authenticated boot-code, it establishes a trusted state for itself. Subsequently, in its trusted state, the one of processors 208 authenticates its own bootloader, kernel, root file systems, and applications to establish its chain of trust.

While system root of trust device 202 can only authenticate one set of boot code at a time, each of processors 208 is allowed to boot once its boot code is authenticated. Thus, one of processors 208 can be booting while system root of trust device 202 authenticates the boot code for the next one of processors 208. For example, system root of trust device 202 may authenticate boot code stored on boot flash device 206A for processor 208A. Afterwards, system root of trust device 202 may authenticate boot code stored on boot flash device 206B for processor 208B while processor 208A authenticates any or all of its bootloader, kernel, root file systems, and/or applications. That is, system root of trust device 202 may authenticate the boot code for processor 208B in parallel with processor 208A authenticating code to be executed by processor 208A. This parallelism allows computing system 200 of this disclosure to achieve a fast overall computing system boot time.

Should a boot-code authentication fail, system root of trust device 202 prevents the corresponding one of processors 208 from booting, and system root of trust device 202 may protect computing system 200 in a clampdown state.

In this manner, the elements of the computing system of FIG. 5 may establish a chain of trust in a parallel fashion. Establishing the chain of trust in a parallel fashion may be faster than having a system root of trust authenticate boot images of processors and other processes executed by the processors in sequence, which would adversely impact system boot time. System root of trust device 202 of FIG. 5 may allow computing system 200 of this disclosure to permit processors 208 to boot from their respective, successfully authenticated boot code and to authenticate the associated executables while system root of trust device 202 simultaneously authenticates the boot code for the next one of processors 208 or element in the boot chain. The capability for overlapping booting and authenticating may be achieved by having the ability for system root of trust device 202 to multiplex access among boot flash devices 206 for various processors 208 and other elements, and the ability to control the processor reset lines 210 for the various processors 208 and other elements as required.

Furthermore, by providing a direct serial peripheral interface (SPI) buses 214/212 from system root of trust device 202 to boot flash devices 206 of processors 208, system root of trust device 202 can authenticate the boot code stored on boot flash devices 206 in place, rather than copying the boot code to memory of system root of trust device 202.

By coupling system root of trust device 202 to processors 208 individually via respective processor reset lines 210, system root of trust device 202 can also independently power off or reset processors 208 that fail. In this manner, system root of trust device 202 can reset any of processors 208 together, or individually reset one or more processors 208 of computing system 200 without necessarily resetting all of processors 208. Thus, these techniques provide greater flexibility than achieved with conventional systems.

Figure 6:
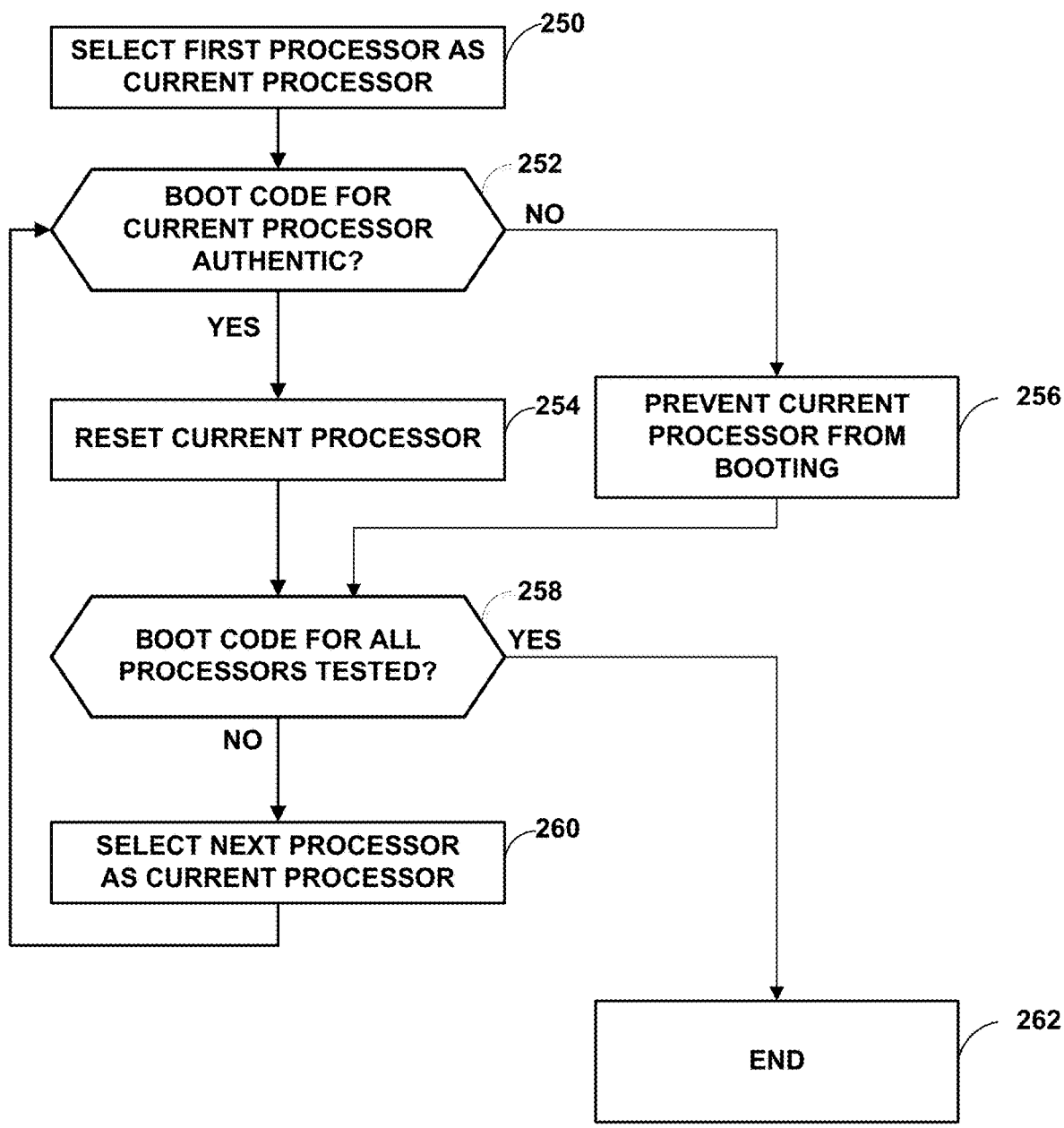
FIG. 6 is a flowchart illustrating an example method for establishing a chain of trust for a computing system according to the techniques of this disclosure.

FIG. 6 is a flowchart illustrating an example method for establishing a chain of trust for a computing system according to the techniques of this disclosure. The method of FIG. 6 may be performed during initialization of a computing system including a system root of trust device and multiple processors having respective sets of boot code. For purposes of example and explanation, the method of FIG. 6 is explained as being performed by system root of trust device 202 of computing system 200 of FIG. 5.

Initially, system root of trust device 202 may hold each of processors 208 in reset via processor reset lines 210. System root of trust device 202 may then select a first one of processors 208 as a current processor (e.g., processor 208A) (250).

System root of trust device 202 may then determine whether boot code for the current processor is authentic (252). For example, system root of trust device 202 may analyze boot code for the current one of processors 208 stored on a respective one of boot flash devices 206 to determine whether the boot code is authentic. System root of trust device 202 may execute Elliptical Curve Digital Signature Algorithm (ECDSA) or other asymmetric key authentication on the boot code to determine whether the boot code is authentic. System root of trust device 202 may test the boot code on the one of boot flash devices 206 directly, rather than copying the boot code to memory of system root of trust device 202.

In response to determining that the boot code for the current processor is authentic ("YES" branch of 252), system root of trust device 202 may reset the current processor (254), allowing the current processor to boot and to authenticate its own bootloader, kernel, root file systems, and applications. However, if the boot code is not authentic ("NO" branch of 252), system root of trust device 202 may prevent the current processor from booting (256).

In any case, system root of trust device 202 may then determine whether the boot code for all of processors 208 has been tested for authenticity (258). If the boot code for all of processors 208 has been tested ("YES" branch of 258), system root of trust device 202 may end (262). On the other hand, if not all boot code has been tested ("NO" branch of 258), system root of trust device 202 may select a next one of processors 208 as the current processor (260) and proceed to authenticate the boot code for the new current processor. System root of trust device 202 may authenticate the boot code for the new current processor in parallel with one or more previous processors authenticating their own bootloader, kernel, root file systems, and applications.

In this manner, the method of FIG. 6 represents an example of a method including determining, by a system root of trust device of a computing system, whether a first set of boot code associated with a first processor of the computing system is authentic; in response to determining that the first set of boot code is authentic, resetting, by the system root of trust device, the first processor to allow the first processor to boot and to authenticate one or more sets of first executable code to be executed by the first processor; after resetting the first processor, determining, by the system root of trust device, whether a second set of boot code associated with a second processor of the computing system is authentic; and in response to determining that the second set of boot code is authentic, resetting, by the system root of trust device, the second processor to allow the second processor to boot and to authenticate one or more sets of second executable code to be executed by the second processor.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
   determining, by a system root of trust device of a computing system, whether a first set of boot code associated with a first processor of the computing system is authentic;
   in response to determining that the first set of boot code is authentic, resetting, by the system root of trust device, the first processor to allow the first processor to boot and to authenticate one or more sets of first executable code to be executed by the first processor;
   after resetting the first processor, determining, by the system root of trust device, whether a second set of boot code associated with a second processor of the computing system is authentic in parallel with the first processor authenticating the one or more sets of first executable code; and
   in response to determining that the second set of boot code is authentic, resetting, by the system root of trust device, the second processor to allow the second processor to boot and to authenticate one or more sets of second executable code to be executed by the second processor.

2. The method of claim 1, further comprising:
   determining, by the first processor, whether the one or more sets of first executable code are authentic; and
   determining, by the second processor, whether the one or more sets of second executable code are authentic.

3. The method of claim 1, further comprising:
   after completing a boot cycle of the computing system, determining that the first processor has failed; and
   in response to determining that the first processor has failed, resetting the first processor without resetting the second processor.

4. The method of claim 1,
   wherein determining whether the first set of boot code is authentic comprises accessing the first set of boot code via a multiplexer, and
   wherein determining whether the second set of boot code is authentic comprises accessing the second set of boot code via the multiplexer.

5. The method of claim 4,
   wherein accessing the first set of boot code comprises accessing the first set of boot code on a first flash device without copying the first set of boot code, and
   wherein accessing the second set of boot code comprises accessing the second set of boot code on a second flash device without copying the second set of boot code.

6. The method of claim 1,
   wherein determining whether the first set of boot code is authentic comprises executing elliptic curve digital signature algorithm (ECDSA) with the first set of boot code, and
   wherein determining whether the second set of boot code is authentic comprises executing the ECDSA with the second set of boot code.

7. A system root of trust device of a computing system, the system root of trust device comprising one or more processors implemented in circuitry and configured to:
   determine whether a first set of boot code associated with a first processor of the computing system is authentic;
   in response to determining that the first set of boot code is authentic, reset the first processor to allow the first processor to boot and to authenticate one or more sets of first executable code to be executed by the first processor;
   after resetting the first processor, determine whether a second set of boot code associated with a second processor of the computing system is authentic in parallel with the first processor authenticating the one or more sets of first executable code; and
   in response to determining that the second set of boot code is authentic, reset the second processor to allow the second processor to boot and to authenticate one or more sets of second executable code to be executed by the second processor.

8. The system root of trust device of claim 7, wherein the one or more processors are further configured to:
   after completing a boot cycle of the computing system, determine that the first processor has failed; and
   in response to determining that the first processor has failed, reset the first processor without resetting the second processor.

9. The system root of trust device of claim 7,
wherein to determine whether the first set of boot code is authentic, the one or more processors are configured to access the first set of boot code via a multiplexer, and
wherein to determine whether the second set of boot code is authentic, the one or more processors are configured to access the second set of boot code via the multiplexer.

10. The system root of trust device of claim 9,
wherein the one or more processors are configured to access the first set of boot code on a first flash device without copying the first set of boot code, and
wherein the one or more processors are configured to access the second set of boot code on a second flash device without copying the second set of boot code.

11. The system root of trust device of claim 7,
wherein to determine whether the first set of boot code is authentic, the one or more processors are configured to execute an elliptic curve digital signature algorithm (ECDSA) with the first set of boot code, and
wherein to determine whether the second set of boot code is authentic, the one or more processors are configured to execute the ECDSA with the second set of boot code.

12. A computing system comprising:
a plurality of processors including a first processor and a second processor; and
a system root of trust device comprising one or more processors implemented in circuitry and configured to:
  determine whether a first set of boot code associated with a first processor of the computing system is authentic;
  in response to determining that the first set of boot code is authentic, reset the first processor to allow the first processor to boot and to authenticate one or more sets of first executable code to be executed by the first processor;
  after resetting the first processor, determine whether a second set of boot code associated with a second processor of the computing system is authentic in parallel with the first processor authenticating the one or more sets of first executable code; and
  in response to determining that the second set of boot code is authentic, reset the second processor to allow the second processor to boot and to authenticate one or more sets of second executable code to be executed by the second processor.

13. The computing system of claim 12,
wherein the first processor is configured to determine whether the one or more sets of first executable code are authentic, and
wherein the second processor is configured to determine whether the one or more sets of second executable code are authentic.

14. The computing system of claim 12, wherein the one or more processors are further configured to:
  after completing a boot cycle of the computing system, determine that the first processor has failed; and
  in response to determining that the first processor has failed, reset the first processor without resetting the second processor.

15. The computing system of claim 12, further comprising a multiplexor,
wherein to determine whether the first set of boot code is authentic, the one or more processors are configured to access the first set of boot code via the multiplexer, and
wherein to determine whether the second set of boot code is authentic, the one or more processors are configured to access the second set of boot code via the multiplexer.

16. The computing system of claim 15, further comprising a first flash device storing the first set of boot code and a second flash device storing the second set of boot code,
wherein the one or more processors are configured to access the first set of boot code on the first flash device without copying the first set of boot code, and
wherein the one or more processors are configured to access the second set of boot code on the second flash device without copying the second set of boot code.

17. A computer-readable storage medium having stored thereon instructions that, when executed, cause a processor of a system root of trust device of a computing system to:
  determine whether a first set of boot code associated with a first processor of the computing system is authentic;
  in response to determining that the first set of boot code is authentic, reset the first processor to allow the first processor to boot and to authenticate one or more sets of first executable code to be executed by the first processor;
  after resetting the first processor, determine whether a second set of boot code associated with a second processor of the computing system is authentic in parallel with the first processor authenticating the one or more sets of first executable code; and
  in response to determining that the second set of boot code is authentic, reset the second processor to allow the second processor to boot and to authenticate one or more sets of second executable code to be executed by the second processor.

* * * * *